UNITED STATES PATENT OFFICE.

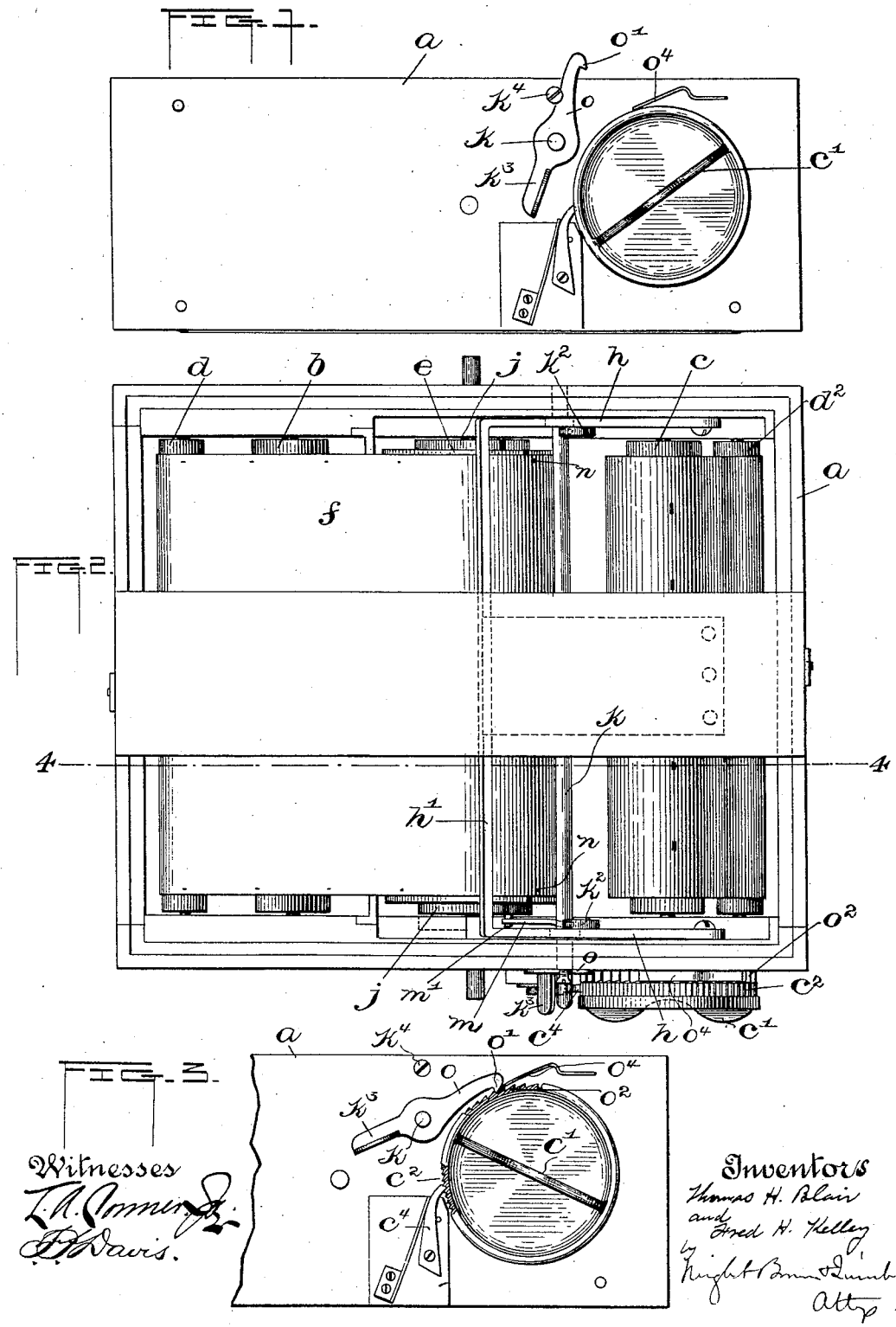

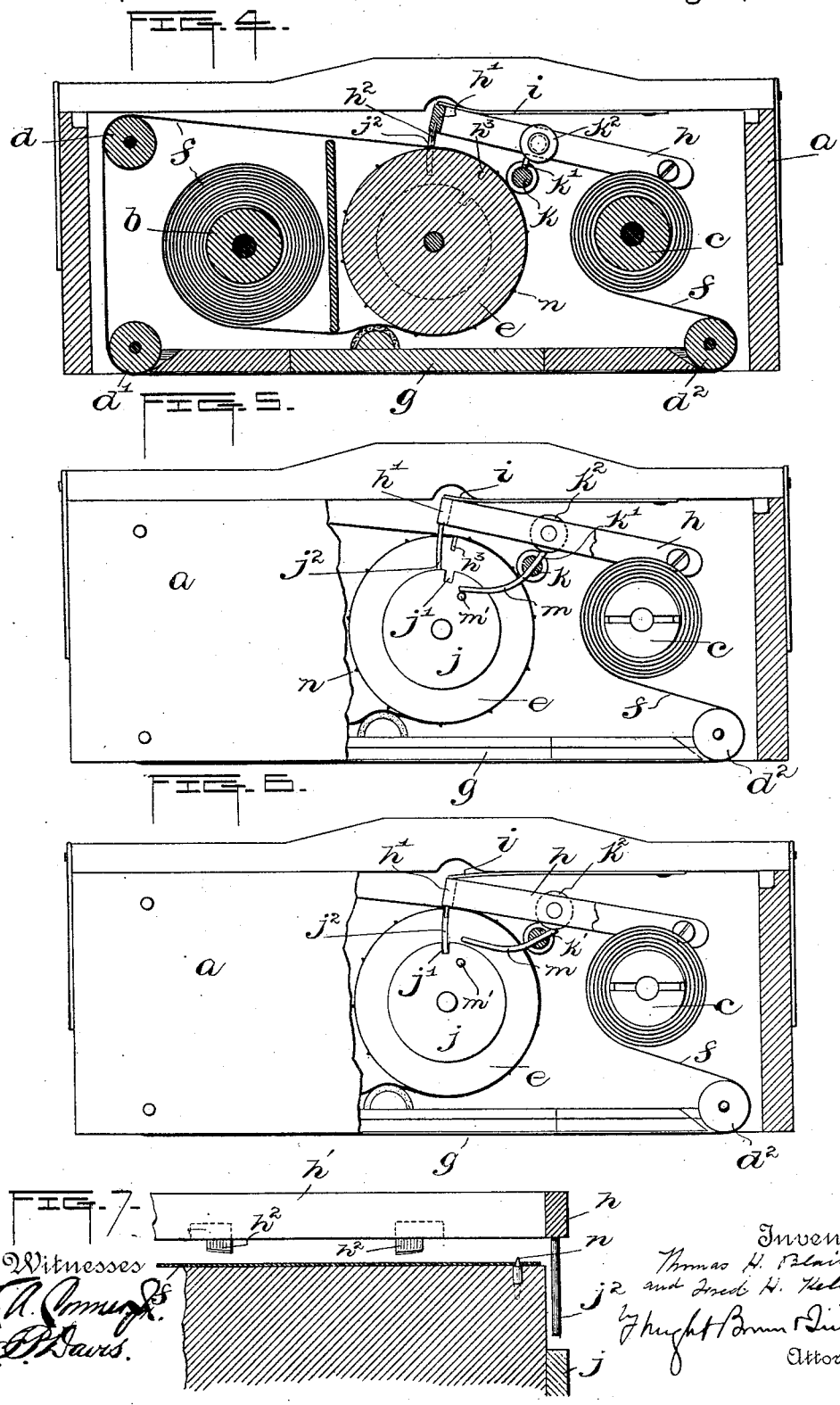

THOMAS H. BLAIR AND FRED H. KELLEY, OF BOSTON, MASSACHUSETTS, ASSIGNORS, BY DIRECT AND MESNE ASSIGNMENTS, TO THE AMERICAN CAMERA MANUFACTURING COMPANY, OF NORTHBOROUGH, MASSACHUSETTS.

PHOTOGRAPHIC ROLL-HOLDER.

SPECIFICATION forming part of Letters Patent No. 565,323, dated August 4, 1896.

Application filed November 11, 1895. Serial No. 568,537. (No model.)

*To all whom it may concern:*

Be it known that we, THOMAS H. BLAIR and FRED H. KELLEY, of Boston, in the county of Suffolk and State of Massachusetts, have invented certain new and useful Improvements in Roll-Holders for Cameras, of which the following is a specification.

The present invention relates to an improvement in that class of devices known as "roll-holders," for use in photographic cameras. It is highly desirable that a device of this kind contain means for marking the film to indicate the lines of division between the different exposures, and certain desiderata are essential to practicability of such marking apparatus, among which may be mentioned accuracy in placing the marks at equidistant points, maintenance of a proper tension of the film, and clamping of the film when marked, as well as locking of the apparatus at this time and during the exposure.

The invention herein disclosed will be found to provide for all of the desiderata above mentioned, and the essential features of construction will be found recited in the appended claims.

The drawings which accompany and form part of this specification illustrate an embodiment of the invention.

Figure 1 shows a top plan view of the device. Fig. 2 shows a rear elevation. Fig. 3 shows a view similar to Fig. 1 with the parts under a different adjustment and some of them broken away. Fig. 4 shows a longitudinal section, taken on line 4 4 of Fig. 2, with the film free to be fed. Figs. 5 and 6 show sectionalized top views with the parts in different relative positions assumed at different stages in the operation of the apparatus. Fig. 7 shows a sectional detail on an enlarged scale.

The letter $a$ designates the exterior casing, which affords bearings for the journals of a supply-roll $b$, a take-up roll $c$, guide-rolls $d$ $d'$ $d^2$, and a measuring-roll $e$. The film $f$ passes from the roll $b$ around the roll $e$, thence around the guide-rolls $d$ and $d'$ and over a front plate $g$, and then around the roll $d^2$ and onto the take-up roll $c$. The journal of the latter extends through the side of the casing and carries a thumb-piece $c'$ by which to turn it, and a ratchet $c^2$, engaged by a pawl $c^4$, which prevents backlash.

The general construction and arrangement of the parts thus far described is common in this class of devices.

In carrying out the present invention we arrange, in conjunction with the measuring-roll, a marking and clamping device in the form of a frame having side arms $h$, pivoted to the casing sides, and a bar $h'$, extending between said side arms. Movement of said frame in one direction on its pivots moves the bar $h'$ against the periphery of the measuring-roll and clamps the interposed film, the said bar carrying a number of teeth or small blades $h^2$, adapted to cut through the film and enter a longitudinal slot $h^3$ in the periphery of the roll. Movement of the frame in the opposite direction entirely frees the bar and its teeth from the film, as shown in Fig. 2. A flat spring $i$, fastened to the back of the casing, presses against the clamping-bar $h'$ and tends to move it to its clamping position.

The measuring-roll carries on each end a disk $j$, which at a point in radial alinement with the slot $h^3$ in the roll is formed with a notch $j'$, and the clamping-bar $h'$ carries at each end a foot-piece $j^2$, projecting past the end of the roll and designed to bear at its end against the disk $j$ at that end of the roll. While the said feet or projections $j^2$ ride on the peripheries of the disks, the clamping-bar is held away from the film, as are also its marking-teeth. When, however, the notches of said disks are brought to position of registry with said projections, and the clamping-frame is otherwise free to move inward, said frame may then partake of its full clamping movement, the projections $j^2$ entering the notches $j'$. It is to be noted that when such action takes place not only is the film clamped and marked, but the measuring-roll is locked. It may be also said here that greater accuracy in establishing the division-marks is secured by arranging the clamp to act against the periphery of the measuring-roll rather than against any auxiliary backrest.

Means for manipulation by the operator in setting the marker are here shown as of the following description: A rock-shaft $k$, journaled in the sides of the casing, carries arms $k'$, designed to act against antifriction-rollers $k^2$ on the sides of the clamping-frame, so that by turning said shaft the said frame may be moved outwardly or away from the measuring-roll and the film. The shaft extends through the side of the casing, and is equipped with a thumb-piece or handle $k^3$ by which to turn it, and this thumb-piece has an extension $o$ on the opposite side of the shaft, adapted to contact with a stop-pin $k^4$ when the thumb-piece is turned in a direction to release the clamp. When thus turned, the arms $k'$ pass slightly beyond a plane embracing the centers of the antifriction-rollers and the rock-shaft, and hence the pressure of said rollers on the arms tends to hold the turn-piece against the stop-pin. The extension $o$ is formed at its end with a dog $o'$, and on the journal of the take-up roll is mounted a ratchet $o^2$, reverse to the ratchet $c^2$, with which ratchet $o^2$ said dog $o'$ is designed to engage and prevent forward turning of the winding-on roll, as will hereinafter appear. The rock-shaft $k$ carries near one end an arm $m$, which projects partly across the disk $j$ at this end of the measuring-roll, and that disk carries a tappet-pin $m'$, which is designed to act against said arm $m$ to turn the shaft and thereby displace the arms $k'$. It is to be noted that this tappet-pin is located to one side of the notch $j'$ and is adapted to act against the arm $m$ before the said notch is brought to a position of alinement with the foot-piece $j^2$. The purpose of this is to put the film under tension before it is clamped and marked, the pressure of the feet $j^2$ on the peripheries of the disks creating sufficient resistance to increase the tension of the film.

In operation, the extension $o$ of the turn-piece $k^3$ having been moved against the stop-pin $k^4$ and the clamping-bar thereby moved away from the film with its teeth clear of the same, (see Fig. 2,) the thumb-piece $c'$ is turned, and the film thereby wound upon the roll $c$ and the measuring-roll turned by the engagement of the film therewith. It may be stated in this connection that the measuring-roll will have rows of points $n$, near each end, to penetrate the film and establish a positive relation between it and the roll. The turning of the measuring-roll eventually brings the tappet-pin $m'$ against the arm $m$ of the rock-shaft, and this action causes displacement of the arms $k'$, so that the spring $i$ throws the clamping-bar toward the measuring-roll. Engagement of said clamping-bar and its teeth with the film does not take place, however, until the measuring-roll has been farther advanced, so as to bring the notches $j'$ of its disks $j$ in registry with the feet $j^2$. When this relation is established, the spring $i$ again acts and this time projects the teeth of the clamping-bar through the film and presses said bar against the film. This final inward movement of the clamping-frame under impulse of the spring $i$ produces a movement of the turn-piece $k^3$, by reason of the rollers $k^2$ acting on the sides of the arms $m'$, and this movement of the turn-piece throws its dog $o'$ into engagement with the ratchet $o^2$ on the journal of the take-up roll. Thus when the film has been clamped against the measuring-roll the take-up roll is positively locked. A spring $o^4$ is arranged in the path of the extension $o$ to cushion the stroke of the same.

It will now be seen that the apparatus described fulfils the objects primarily stated. It will, however, be apparent that the construction is susceptible of modification without departing from the spirit of the invention.

What we claim as our invention is as follows:

1. In a roll-holder for cameras, the combination with a measuring-roll, of a marking and clamping device movable toward and from the periphery of said roll and designed to coact therewith in marking and clamping the film, and detent mechanism controlling the operation of said marking and clamping device.

2. In a roll-holder for cameras, the combination with a measuring-roll, of a marking and clamping device movable toward and from the periphery of said roll and yieldingly actuated toward the latter, a detent holding said marking and clamping device away from the periphery of the roll, and means carried by the measuring-roll for displacing the detent.

3. In a roll-holder for cameras, the combination of a measuring-roll having a notched disk, a marking and clamping device movable toward and from the periphery of said roll and having a projection to ride on the said disk and adapted to enter the notch thereof, means yieldingly actuating the marking and clamping device toward the roll, a setting detent holding said device away from the roll and the projection thereof away from the notched disk, and means carried by the roll in advance of the notch of said disk for displacing the said detent, the displacement of the latter allowing movement of the marking-clamp toward the roll until the projection of said clamp encounters the periphery of the notched disk, and said projection subsequently entering the notch, for the purpose described.

4. In a roll-holder for cameras, the combination of a measuring-roll having a longitudinal slot in its periphery and a disk with a notch corresponding in location with said slot; a clamping-bar movable toward and from the periphery of said roll and having teeth to enter the slot therein and a projection to enter the notch of the disk; means yieldingly actuating said bar toward the roll; and a detent to hold the clamping-bar away from the roll and adapted to be displaced by a tappet-piece on the roll.

5. In a roll-holder for cameras, the combination of a film-marker in the form of a pivoted spring-pressed frame with side arms carrying rollers; a rock-shaft having arms to coact with the peripheries of said rollers and provided with a handle; and a measuring-roll having means for tripping the rock-shaft, substantially as described.

6. In a roll-holder for cameras, the combination of a take-up roll having a ratchet, a measuring-roll, a spring-actuated film-marker movable toward and from the said measuring-roll, a rock-shaft having means for moving said marker away from the measuring-roll and also provided with a dog to engage the ratchet of the take-up roll, and means carried by the measuring-roll for tripping the rock-shaft.

7. In a roll-holder for cameras, the combination of a measuring-roll having a slot in its periphery and a notched disk with a tappet-piece; a pivoted frame having side arms equipped with rollers, and a clamping-bar to press against the roll over its slot and provided with projections to enter said slot, the said frame being also provided with a foot-piece to bear on the notched disk; a spring impelling the frame toward the roll; a rock-shaft having arms coacting with the rollers on the frame to move the latter in opposition to the spring, said shaft also provided with an arm extending in the path of the tappet-piece on the notched disk; a handle on said rock-shaft having a dog; and a take-up roll having a ratchet adapted to be engaged by said dog.

In testimony whereof we have signed our names to this specification, in the presence of two subscribing witnesses, this 27th day of February, A. D. 1895.

THOMAS H. BLAIR.
FRED H. KELLEY.

Witnesses:
C. F. BROWN,
A. D. HARRISON.